United States Patent [19]

Robinson et al.

[11] 4,370,171

[45] Jan. 25, 1983

[54] METHOD FOR DISPERSING COMMINUTED SOLIDS

[75] Inventors: Glenn N. Robinson, Terre Haute; Charles E. Seeney, Brazil, both of Ill.

[73] Assignee: Angus Chemical Co., Northbrook, Ill.

[21] Appl. No.: 230,249

[22] Filed: Feb. 2, 1981

[51] Int. Cl.³ .......................... C09C 1/36; C09C 1/24
[52] U.S. Cl. .................... 106/300; 106/306; 106/308 N
[58] Field of Search ............. 106/300, 308 Q, 308 N, 106/306

[56] References Cited

U.S. PATENT DOCUMENTS

| | | | |
|---|---|---|---|
| 3,205,085 | 9/1965 | Balin | 106/300 |
| 3,674,528 | 7/1972 | Bronson | 106/300 |
| 4,165,239 | 8/1979 | Linden et al. | 106/300 |
| 4,170,485 | 10/1979 | Blake et al. | 106/300 |
| 4,186,028 | 1/1980 | Woditsch et al. | 106/300 |
| 4,227,935 | 10/1980 | Blake et al. | 106/300 X |
| 4,235,768 | 11/1980 | Ritter et al. | 106/300 X |
| 4,280,849 | 7/1981 | Howard et al. | 106/300 |

*Primary Examiner*—Carl F. Dees
*Attorney, Agent, or Firm*—Leydig, Voit, Osann, Mayer & Holt, Ltd.

[57] ABSTRACT

A method for dispersing a comminuted solid in an aqueous medium using a combination of an alkanolamine and a polymeric carboxylic acid as the dispersing agent.

21 Claims, No Drawings

METHOD FOR DISPERSING COMMINUTED SOLIDS

BACKGROUND OF THE INVENTION

This invention relates to a method for dispersing comminuted solids. In a particular aspect, this invention relates to dispersing solids in an aqueous medium.

Slurries and suspensions of comminuted solids in an aqueous medium are customarily formed using a dispersing agent. Such an agent can be inorganic, such as alkali phosphates, or more often an organic surfactant is used. Such surfactants include fatty acid soaps of an alkali metal or an alkanolamine, a long chain quaternary ammonium halide, or a non-ionic, such as a polyoxyethylene ether or ester. Also, alkanolamines per se have been used to disperse powdered titanium dioxide to produce slurries which are used in a variety of ways, such as to provide a convenient form for shipping the pigment, or for the preparation of water-based coating materials. More specifically, it is known from U.S. Pat. Nos. 3,702,773 and 3,772,046 and Canadian Pat. No. 776,183 to prepare aqueous slurries of titanium dioxide using an alkanolamine, such as 2-amino-2-methyl-1-propanol (hereinafter designated AMP).

SUMMARY OF THE INVENTION

It is an object of this invention to provide a method for dispersing comminuted solids.

It is another object of this invention to provide a method for dispersing solids in an aqueous medium.

It is yet another object of this invention to provide a method for dispersing calcium carbonate solids which develop in aqueous hard water systems.

It is still yet another object of this invention to provide a method for preparing slurries of pigments in water.

Other objects will be apparent to those skilled in the art from the disclosure herein.

It is the discovery of this invention to provide a method for dispersing a comminuted solid in an aqueous medium using as the dispersing agent a combination of an alkanolamine and a carboxylic acid polymer or copolymer or mixture thereof in an equivalent weight ratio of about 0.5–1.5:1.0 respectively, consisting essentially of (a) an alkanolamine and (b) a polymer or copolymer of (1) acrylic or methacrylic acid in an equivalent weight ratio of 0.5–1.5:1 respectively, or a mixture thereof, or (2) a copolymer of acrylic or methacrylic acid or mixture thereof, or (3) carboxymethyl cellulose, or (4) other carboxy-terminated polymers.

DETAILED DISCUSSION

The combination of the present invention includes but is not limited to combinations of (a) an alkanolamine and (b) a polymer or copolymer of (1) acrylic or methacrylic acid or mixture thereof, or (2) a copolymer of acrylic or methacrylic acid or mixture thereof, or (3) carboxymethyl cellulose or (4) other carboxy-terminated polymers.

The alkanolamines useful in the practice of this invention can be primary, secondary or tertiary and can be represented by the formula:

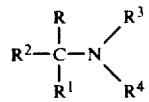

where R and $R^1$ can be hydrogen, methyl or hydroxymethyl and can be the same or different. $R^2$ can be methyl, ethyl or hydroxymethyl and $R^3$ and $R^4$ can be hydrogen, methyl or ethyl and can be the same or different. These alkanolamines include but are not limited to 2-amino-2-methyl-1-propanol (AMP); 2-amino-1-butanol; 2-amino-2-methyl-1,3-propanediol; 2-amino-2-ethyl-1,3-propanediol; 2-amino-2-hydroxymethyl-1,3-propanediol and N-methyl or ethyl and N,N-dimethyl or diethyl derivatives thereof. Also included are the ethanolamines and propanolamines and N-substituted alkyl (e.g. methyl or ethyl) derivatives thereof. AMP is the preferred alkanolamine for the practice of this invention.

Polyacrylic acid and polymethacrylic are known in the art and are commercially available. The commercial products are suitable for the practice of this invention. Generally polymers having a molecular weight within the range of 1000 to 10,000 are preferred and those having an average molecular weight in the neighborhood of 2000 are particularly preferred.

The alkanolamine and polymeric carboxylic acid (e.g. polyacrylic or polymethacrylic acid) are reacted by mixing the desired quantities in aqueous solution. Thus, after determining the equivalent weight of the polymeric acid by any suitable method, many of which are known, a suitable amount is dispersed in water. Then an alkanolamine in an amount of 0.5–1.5 equivalents per equivalent of polymeric acid is added with stirring and the mixture is then ready for use. The preferred amount of alkanolamine is that sufficient to provide a 1:1 ratio of equivalents.

The combination of this invention is useful for dispersing a wide variety of comminuted solids including but not limited to calcium carbonate such as occurs in aqueous systems employing hard water (e.g. cooling tower waters and boiler waters), inorganic pigments such as iron oxides, talc (magnesium silicate), silica, mica, bentonite, carbon black, chrome pigments, and organic pigments. The invention is especially useful for preparing typical water-based coating materials.

The amount of alkanolamine combination with polymeric carboxylic acid, or mixture thereof, to be used varies somewhat with regard to the comminuted solid to be dispersed and the degree of stability desired. Generally from 0.001% to about 10% based on the weight of the comminuted solid is sufficient. More often the amount will be from 0.01–5% and a commonly used amount is from 0.1–1.0%. The optimum amount required for any particular use can be readily determined by one of ordinary skill.

The invention will be better understood with reference to the following examples. It is understood, however, that these examples are intended only to illustrate the invention and it is not intended that the invention be limited thereby.

EXAMPLE 1

AMP polyacrylate was prepared by mixing AMP with a 65% solution of polyacrylic acid having an average molecular weight of about 2000 in a 1:1 equivalent weight ratio i.e. 1 g of AMP per 1.24 g of a 65% solution of polyacrylic acid, in the presence of sufficient water to form a 25% solution. Of this solution, 0.025 g was diluted with 1000 g of water to form a solution of 6.25 ppm of dispersant.

A saturated aqueous solution of sodium bicarbonate at room temperature was prepared, as was a saturated aqueous calcium hydroxide solution. Into a 10 ml graduated cylinder there was added 3.3 ml of the calcium hydroxide solution and 1 ml of the AMP-polyacrylic acid solution. Sodium bicarbonate solution was then added in an amount sufficient to make 10 ml, thus providing a concentration of 0.625 ppm of the dispersant. A similar test was run as a control except that no dispersant was added. The turbidity of the cylinders was measured every 30 minutes in a turbidimeter. The longer the dispersions remained turbid, the more satisfactory the dispersing agent. The results are given in the table. It was concluded that AMP polyacrylate was an excellent dispersant for calcium carbonate and was suitable for use in cooling tower waters.

TABLE

| Time, Hours | Degree of Settling | |
|---|---|---|
| | Control | AMP-Polyacrylate |
| 0.5 | 1.2% | 0% |
| 1.0 | 4.0% | 4.0% |
| 1.5 | 10.0% | 4.0% |
| 2.0 | 14.0% | 10.0% |
| 2.5 | 20.0% | 15.0% |
| 3.0 | 24.0% | 19.0% |
| 3.5 | 29.0% | 22.0% |
| 4.0 | 40.0% | 26.0% |

EXAMPLE 2

The experiment of Example 1 is repeated in all essential details except that AMP-polymethacrylate is substituted for AMP polyacrylate. The AMP polymethacrylate is an effective dispersant for calcium carbonate.

EXAMPLE 3

2-Amino-2-methyl-1-propanol (mol. wt. 89) (AMP) and polyacrylic acid (PAA) having a molecular weight of 2000 were reacted at ambient temperatures in equivalent weight ratios of 0.5:1, 1:1 and 1.5:1 respectively in aqueous solution, as per the following table:

| Ratio | AMP, g | PAA*, g | Water, g | Initial pH |
|---|---|---|---|---|
| 0.5:1 | 23.8 | 59.4 | 166.7 | 5.5 |
| 1:1 | 34.6 | 42.9 | 172.5 | 9.9 |
| 1.5:1 | 40.6 | 33.6 | 175.7 | 10.4 |

*As 65% aqueous solution

A series of slurries of titanium dioxide in water with varying amounts of dispersant were prepared. For each slurry, 380 g of titanium dioxide and 116.2 g of water were used. In one series, combinations of AMP with PAA of 2000 molecular weight was used, and in a second series, combinations of AMP with PAA of 5000 molecular weight was used. The slurries were mixed for 10 minutes in a mill and then the viscosities were determined using a Brookfield RV viscometer at 100 rpm with a No. 3 spindle. The slurry with the lowest viscosity and minimal settling contained the optimum amount of dispersant. The data are given in the following table:

| Ratio, AMP:PAA | Dispersant*, % | Viscosity**, cps A | Viscosity**, cps B | Type of Settle+ A | Type of Settle+ B |
|---|---|---|---|---|---|
| 0.5 | 0.1 | 475 | 590 | H | H |
| | 0.25 | 440 | 445 | H | H |
| | 0.50 | 1240 | 680 | H | H |
| 1.0 | 0.1 | 445 | 780 | S | H |
| | 0.25 | 440 | 700 | S | H |
| | 0.50 | 525 | 840 | S | H |
| 1.5 | 0.1 | 625 | 990 | H | H |
| | 0.25 | 445 | 790 | H | H |
| | 0.50 | 870 | 1250 | H | H |

*Based on weight of pigment
**Brookfield at 100 rpm, No. 3 spindle
+H = hard settle; S = soft settle
A - molecular weight of dispersant about 2000
B - molecular weight of dispersant about 5000

As can be readily seen, 0.25% based on the weight of the pigment of a 1:1 combination of AMP and PAA of 2000 molecular weight gives the lowest viscosity and settling.

EXAMPLE 4

A water-based, flat wall paint of the interior type was prepared according to the following formula.

| Premix | |
|---|---|
| Deionized Water | 194.5 lb |
| AMP Polyacrylate (25% solution) | 9.5 lb |
| Disperse Pigments | |
| Titanium Dioxide | 150.0 |
| Calcium Carbonate | 200.0 |
| Aluminum Silicate | 125.0 |
| Then add | |
| Ethylene Glycol | 30.0 |
| Hydroxyethyl Cellulose* | 235.8 |
| Tributyl Phosphate | 15.0 |
| Vinyl Acetate Copolymer Emulsion | 200.0 |
| Defoamer | 2.0 |
| Non-ionic Wetting Agent | 2.0 |
| Ammonium Hydroxide (26%) | 2.5 |
| Yield | 100.0 gal |

*2.5% aqueous solution

This formulation had a stable viscosity and pH. When applied to a substrate and dried, it gave a very white and opaque film.

EXAMPLE 5

The experiment of Example 4 is repeated in all essential details except that polymethacrylic acid is substituted for polyacrylic acid on an equivalent weight basis. The resulting paint has a stable viscosity and when applied to a substrate and dried, it gives a very white and opaque film.

EXAMPLE 6

The experiment of Example 4 is repeated in all essential details except that carboxymethyl cellulose is substituted for polyacrylic acid on an equivalent weight basis. The resulting paint has a stable viscosity and when applied to a substrate and dried, it gives a very white and opaque film.

We claim:

1. A method for dispersing a comminuted solid in an aqueous medium comprising the step of using as a dispersant a combination of an alkanolamine with a polymeric carboxylic acid selected from the group consisting of polyacrylic acid, polymethacrylic acid and carboxymethyl cellulose.

2. The method of claim 1 wherein the alkanolamine is 2-amino-2-methyl-1-propanol (AMP); 2-amino-1-butanol; 1,3-propanediol; 2-amino-2-hydroxymethyl-1,3-propanediol; or 2-amino-2-hydroxymethyl-1,3-propanediol or N-methyl and N,N-dimethyl derivatives thereof, or the mono-, di-, and triethanolamines or propanolamines or N-substituted alkyl derivatives thereof, or mixtures thereof.

3. The method of claim 1 wherein the combination of an alkanolamine with polyacrylic acid is used.

4. The method of claim 1 wherein the combination of an alkanolamine with polymethacrylic acid is used.

5. The method of claim 1 wherein the polymeric acid is carboxymethyl cellulose.

6. A method of dispersing a comminuted solid in an aqueous medium comprising the step of using as a dispersant a combination comprising 2-amino-2-methyl-1-propanol and polyacrylic acid having a molecular weight in the range of 1000–5000.

7. The method of claim 1 wherein the alkanolamine is present in the combination in an equivalent weight ratio of 0.5–1.5:1.

8. The method of claim 1 wherein the alkanolamine is present in the combination in an equivalent weight ratio of about 1:1.

9. The method of claim 1 wherein the polyacrylic acid or polymethacrylic acid has a molecular weight in the range of about 1,000 to 10,000.

10. The method of claim 9 wherein the molecular weight is in the range of 1000 to 5000.

11. The method of claim 1 wherein the dispersant is used in an amount of 0.001% to 10.0% based on the weight of the comminuted solid.

12. The method of claim 8 wherein the amount of dispersant is from 0.01 to 5%.

13. The method of claim 8 wherein the amount of dispersant is from 0.1 to 1.0%.

14. The method of claim 1 wherein the comminuted solid is calcium carbonate formed in situ.

15. The method of claim 1 wherein the comminuted solid is a pigment and the aqueous medium is a water-based coating material.

16. An aqueous slurry of a comminuted pigment consisting essentially of a pigment, water and a salt of claim 1.

17. An aqueous slurry of a comminuted pigment consisting essentially of a pigment, water and a composition of 2-amino-2-methyl-1-propanol with polyacrylic acid.

18. The slurry of claim 13 wherein the pigment is titanium dioxide.

19. A composition comprising an alkanolamine and polyacrylic or polymethacrylic acid, or mixtures thereof, in an equivalent weight ratio of 0.5–1.5:1 respectively.

20. The composition of claim 19 wherein the alkanolamine is 2-amino-2-methyl-1-propanol.

21. The composition of claim 20 wherein the alkanolamine is in combination with polyacrylic acid.

* * * * *